US008726324B2

(12) United States Patent
Tirpak et al.

(10) Patent No.: US 8,726,324 B2
(45) Date of Patent: May 13, 2014

(54) METHOD FOR IDENTIFYING IMAGE CAPTURE OPPORTUNITIES USING A SELECTED EXPERT PHOTO AGENT

(75) Inventors: Thomas Michael Tirpak, Glenview, IL (US); Anant Athale, Schaumburg, IL (US)

(73) Assignee: Motorola Mobility LLC, Chicago, IL (US)

( * ) Notice: Subject to any disclaimer, the term of this patent is extended or adjusted under 35 U.S.C. 154(b) by 838 days.

(21) Appl. No.: 12/412,663

(22) Filed: Mar. 27, 2009

(65) Prior Publication Data

US 2010/0245596 A1 Sep. 30, 2010

(51) Int. Cl.

| | |
|---|---|
| ***H04N 7/173*** | (2011.01) |
| ***H04N 5/228*** | (2006.01) |
| ***H04N 5/225*** | (2006.01) |
| ***G06K 9/62*** | (2006.01) |
| ***H04N 5/262*** | (2006.01) |

(52) U.S. Cl.
USPC ..................... 725/105; 348/222.1; 348/207.1; 348/239; 382/209; 382/215; 382/217; 455/556.1; 455/557

(58) Field of Classification Search
CPC ......... H04N 7/123; H04N 5/228; H04N 5/76; H04N 5/262; H04N 5/222; H04N 5/232; H04N 5/225; G06K 9/62
USPC .............................. 348/207.1, 222.1, 231.99, 348/211.99–211.12, 231.1; 455/556.1, 557; 382/209, 215, 217; 725/105
See application file for complete search history.

(56) References Cited

U.S. PATENT DOCUMENTS

| | | | |
|---|---|---|---|
| 4,607,949 | A | 8/1986 | Hakamada et al. |
| 5,448,502 | A | 9/1995 | Kindo et al. |
| 5,900,878 | A | 5/1999 | Goto et al. |
| 6,606,117 | B1 | 8/2003 | Windle |
| 6,608,650 | B1 | 8/2003 | Torres et al. |
| 6,628,830 | B1 | 9/2003 | Yamazoe et al. |
| 6,647,139 | B1 | 11/2003 | Kunii et al. |
| 7,006,247 | B1 | 2/2006 | Sekine et al. |
| 7,302,004 | B2 | 11/2007 | Zhang et al. |
| 2004/0184646 | A1 | 9/2004 | Oosawa |
| 2004/0201699 | A1 | 10/2004 | Parulski et al. |
| 2004/0252217 | A1 | 12/2004 | Battles et al. |

(Continued)

FOREIGN PATENT DOCUMENTS

| | | | | |
|---|---|---|---|---|
| EP | 1377045 | A3 | 1/2004 | |
| GB | 2428927 | A | 2/2007 | |
| WO | 2009006949 | A1 | 1/2009 | |
| WO | WO 2009006949 | A1 * | 1/2009 | ............. H04N 5/232 |

OTHER PUBLICATIONS

Patent Cooperation Treaty, International Search Report and Written Opinion of the International Searching Authority for International Application No. PCT/US2010/028206. Aug. 18, 2010, 22 pages.

*Primary Examiner* — Tuan Ho
*Assistant Examiner* — Marly Camargo

(57) ABSTRACT

An apparatus and method for identifying image capture opportunities. Expert photo agents (526) that process meta-data extracted from a captured image are obtained (706) at a user-device (102). Metadata (214) characterizing visual content of a captured image is produced (310) by processing the visual content of the captured image. Image capture opportunities are selected (410) based upon processing of the meta-data with the at least one expert photo agent. The image capture opportunity selection specifies content to capture in a subsequent image.

20 Claims, 6 Drawing Sheets

(56) References Cited

U.S. PATENT DOCUMENTS

| | | | | |
|---|---|---|---|---|
| 2005/0007468 | A1 | 1/2005 | Stavely et al. | |
| 2005/0168588 | A1 * | 8/2005 | Fisher et al. | 348/211.2 |
| 2005/0172147 | A1 * | 8/2005 | Edwards et al. | 713/200 |
| 2006/0040712 | A1 * | 2/2006 | Ansari et al. | 455/566 |
| 2007/0030363 | A1 * | 2/2007 | Cheatle et al. | 348/239 |
| 2007/0250901 | A1 | 10/2007 | McIntire et al. | |
| 2007/0292040 | A1 | 12/2007 | Nakajima | |
| 2008/0056706 | A1 | 3/2008 | Battles et al. | |
| 2008/0056707 | A1 | 3/2008 | Ovsiannikov et al. | |

* cited by examiner

METHOD FOR IDENTIFYING IMAGE CAPTURE OPPORTUNITIES USING A SELECTED EXPERT PHOTO AGENT

FIELD OF THE INVENTION

The present invention relates generally to the field of determining multimedia content capture opportunities, and more particularly relates to selecting photo capture parameters and identifying interesting scenes.

BACKGROUND OF THE INVENTION

With the availability of multimedia capture capabilities on a wide array of devices, communication is becoming more visual, and content sharing more social. Problems traditionally faced by photojournalists and movie directors have become the problems of billions of communication device users world-wide, namely: Where can I get the "best shot"? Once I'm "on location", how do I compose the best shot? When should I shoot, to get the best shot? How can I collaborate with others on a shoot?

Although electronic cameras are able to incorporate automatic exposure control, a user is still left to manually determine which scenes are of interest, and how to best capture an image of them. Therefore, a need exists to improve upon the prior art.

SUMMARY OF THE INVENTION

Briefly, in accordance with the present invention, disclosed is a method for identifying image capture opportunities including obtaining, at a user-device, at least one expert photo agent adapted to process metadata extracted from a captured image. The method also includes producing metadata characterizing visual content of a captured image. The metadata are produced by processing the visual content of the captured image. The method also includes determining, in response to producing the metadata, an image capture opportunity selection based upon processing of the metadata with the at least one expert photo agent. The image capture opportunity selection specifies content to capture in a subsequent image.

Also disclosed is an image capture opportunity detector that includes a memory and a processor that is communicatively coupled to the memory. The processor is adapted to obtain, at a user-device, at least one expert photo agent adapted to process metadata extracted from a captured image. The processor is also adapted to produce metadata characterizing visual content of a captured image. The metadata is produced by processing the visual content of the captured image. The processor is further adapted to determine, in response to producing the metadata, an image capture opportunity selection based upon processing of the metadata with the at least one expert photo agent. The image capture opportunity selection may specify content to capture in a subsequent image.

Further disclosed is an image capture opportunity image capturing device including a camera, at least one environmental sensor, a memory and a processor. The processor is communicatively coupled to the memory, the camera, and the environmental sensor. The processor is adapted to obtain, at a user-device, at least one expert photo agent adapted to process metadata extracted from a captured image. The processor is also adapted to produce metadata characterizing visual content of a captured image. The metadata are produced by processing the visual content of the captured image. The processor is further adapted to determine, in response to producing the metadata, an image capture opportunity selection based upon processing of the metadata with the at least one expert photo agent. The image capture opportunity selection specifies content to capture in a subsequent image. The processor is also adapted to configure the camera to capture, with the at least one capture parameters defined by the image capture opportunity selection, the subsequent image

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
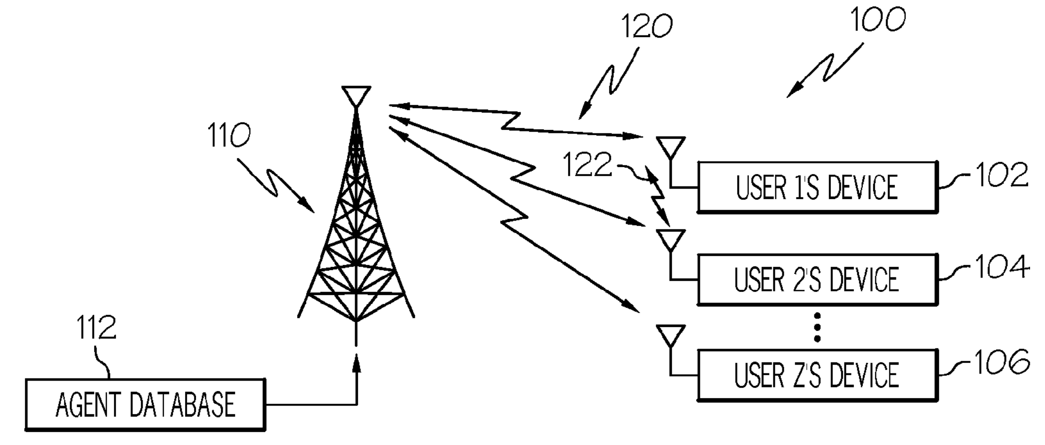
FIG. 1 illustrates a multiple user-device environment, in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward.

One embodiment of the present invention includes a system that monitors an individual's activities and identifies contexts for capturing interesting media such as photos, movies, and the like. One embodiment of the present invention provides processing to use shared or user-defined modules, as selected by a user, that work with sensors and actuators/displays to help guide the user to take, for example, memorable photographs. Example scenarios include, for example, automatically capturing media such as photos, movies and the like, to document highlights of an individual's active lifestyle, e.g., photographs of a mother bear and cub that were unexpectedly encountered at close range while hiking in Rocky Mountain National Park.

One embodiment of the present invention includes a user-customizable system for context-driven media capture and event handling on mobile devices. Examples of processing performed by one embodiment of the present invention include: automated activity monitoring through, for example, image analysis of a scene that is being currently captured by a camera or other image capture device. One embodiment further performs fusion processing of the results of the automated activity monitoring with other sensor data and guides the camera to the most interesting scene to monitor. The processing of one embodiment differentiates between normal and abnormal events that are detected by image analysis, e.g., break-in vs. normal opening of a car door, via Outlier Detection techniques that have been developed for Data Mining applications.

In one embodiment, an image capture capability, such as a camera, is adapted to enable it to capture content that is identified as desirable. Based on the type of content captured, additional actions are taken. In one embodiment, additional image processing is performed to determine if an emergency situation occurs, and a "Help" MMS message is sent to a friend, or a phone call is placed to an In Case of Emergency (ICE) contact.

FIG. 1 illustrates a multiple user-device environment 100, in accordance with one embodiment of the present invention. The multiple user-device environment 100 illustrates a number of user-devices, e.g., user 41's device 102, user 2's device 104 and user Z's device 106, that are in wireless communications with a base station 110 and/or with one another. In one embodiment, the user-devices all have similar processing functionality, although further embodiments are able to operate with different types of user-devices. In the following description, user 1's device 102 is used as an example of the multiple user-devices that are able to be used by various embodiments of the present invention. It is to be understood that further embodiments of the present invention are able to use user-devices that have different capabilities and functionalities from one another.

User-devices such as user 1's device 102 are able to communicate with other user-devices over any suitable communications medium. A wireless network incorporating a wireless communications base station 110 is illustrated in FIG. 1. One example of a wireless communications base station 110 is a cellular base station that is part of a cellular network. User-devices are able to communicate with the base station 110 through, for example, cellular communications signals 120.

Further embodiments of the present invention are able to incorporate communications systems that allow wireless or wired communications directly between user-devices or a combination of communications directly between user-devices and a central base station. In one embodiment, user-devices are also able to directly communicate with other user-devices via, for example, a Bluetooth connection 122 and/or networked services.

As described in further detail below, images, environmental data, expert photo agents and other data or processing definitions used by a user-device is able to be communicated between a user-device and one or more user-devices to facilitate collaborative image collection and/or image collection techniques.

One embodiment of the present invention includes an agent database 112 that is a sharable library storing data that is shared, for example, among user-devices. As is described in further detail below, the agent database 112 stores a central repository of expert photo agents adapted to process metadata extracted from a captured image. The expert photo agents stored in the agent database 112 define processing used to identify image capture opportunities or to control image capture parameters. Image capture parameters, such as exposure and the like, are able to be determined by particular expert photo agents based upon characteristics of the image presented to an image capture device, such as a camera, within a user-device. Some expert agents process image characteristics to adjust image capture parameters so as to implement, for example, a desired photographic style.

Figure 2:
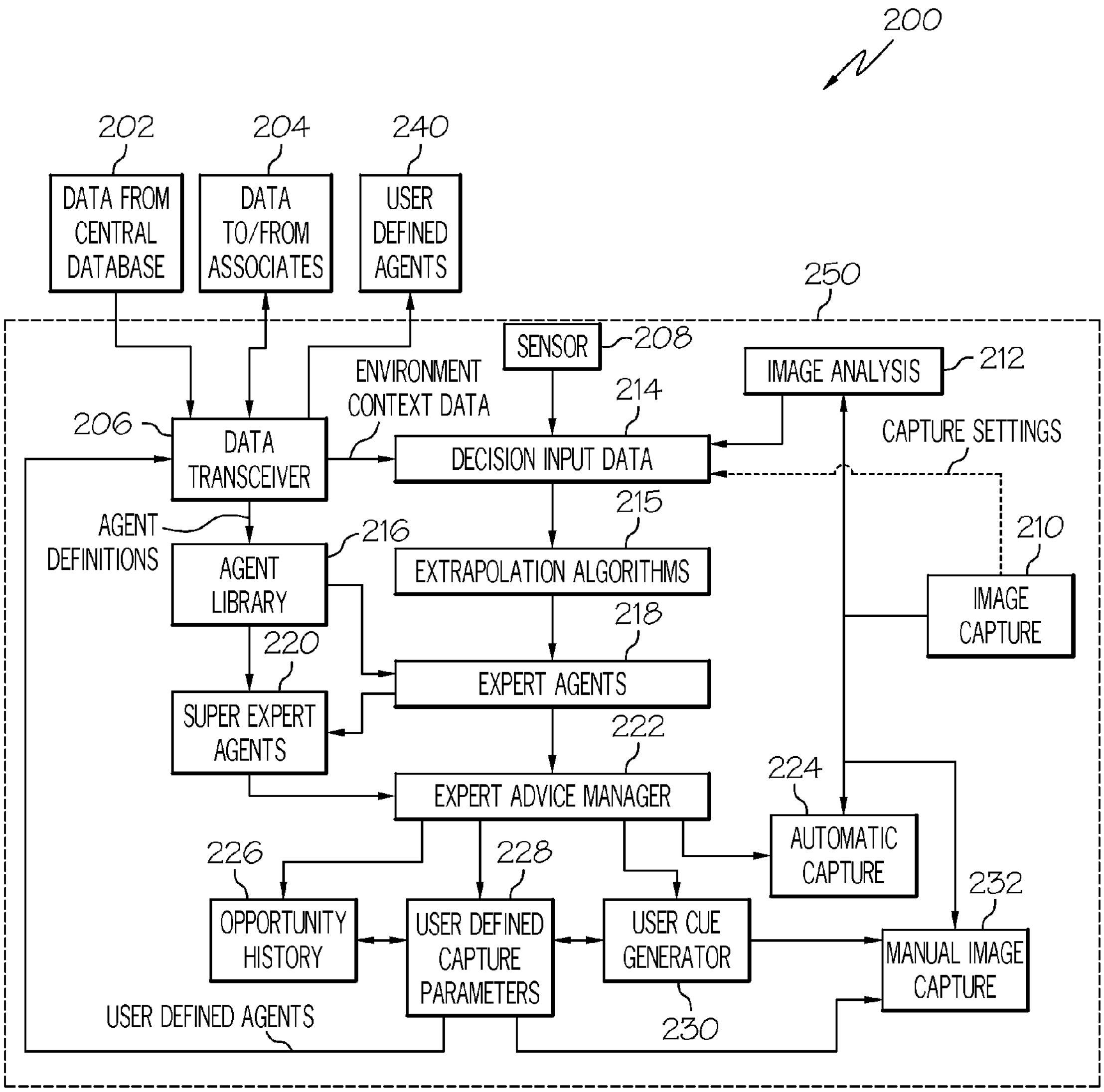
FIG. 2 illustrates a block diagram of a user-device data flow, in accordance with one embodiment of the present invention.
Figure 3:
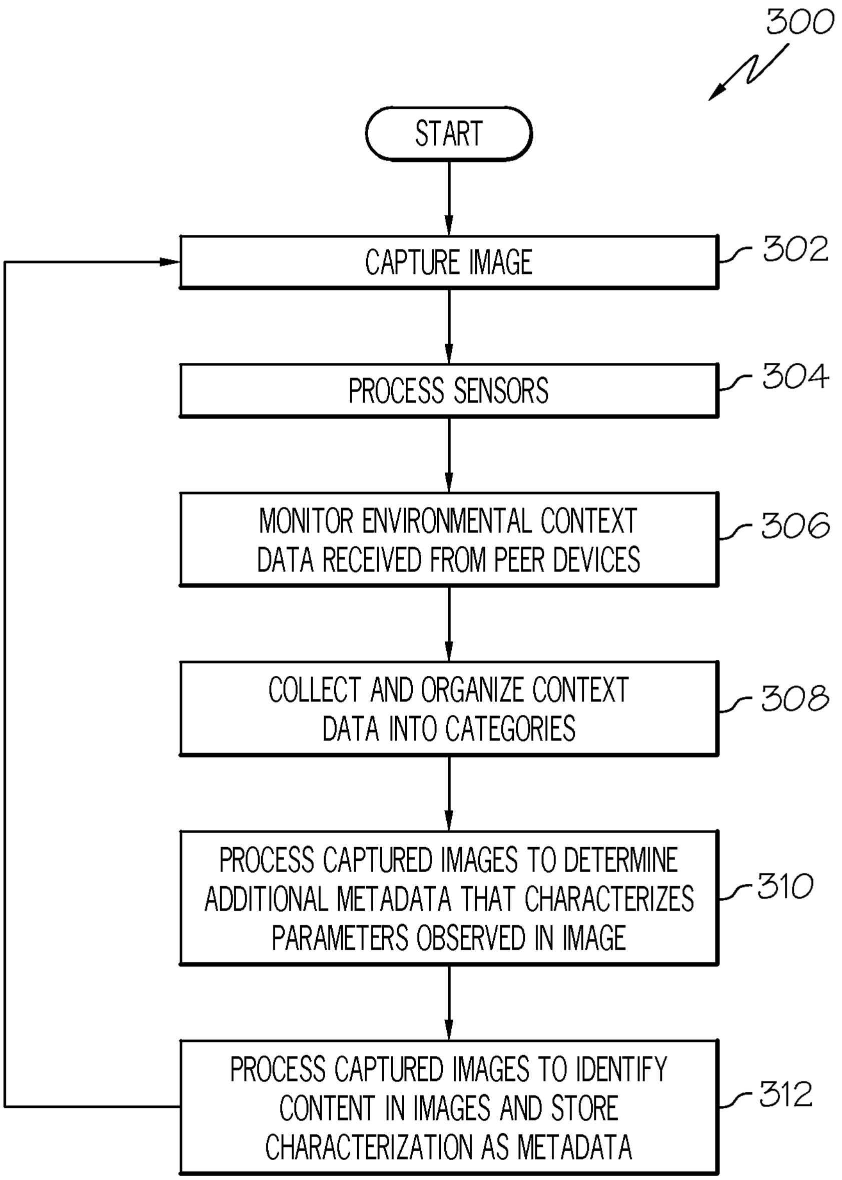
FIG. 3 illustrates a diagram of an image processing flow, in accordance with one embodiment of the present invention.
Figure 4:
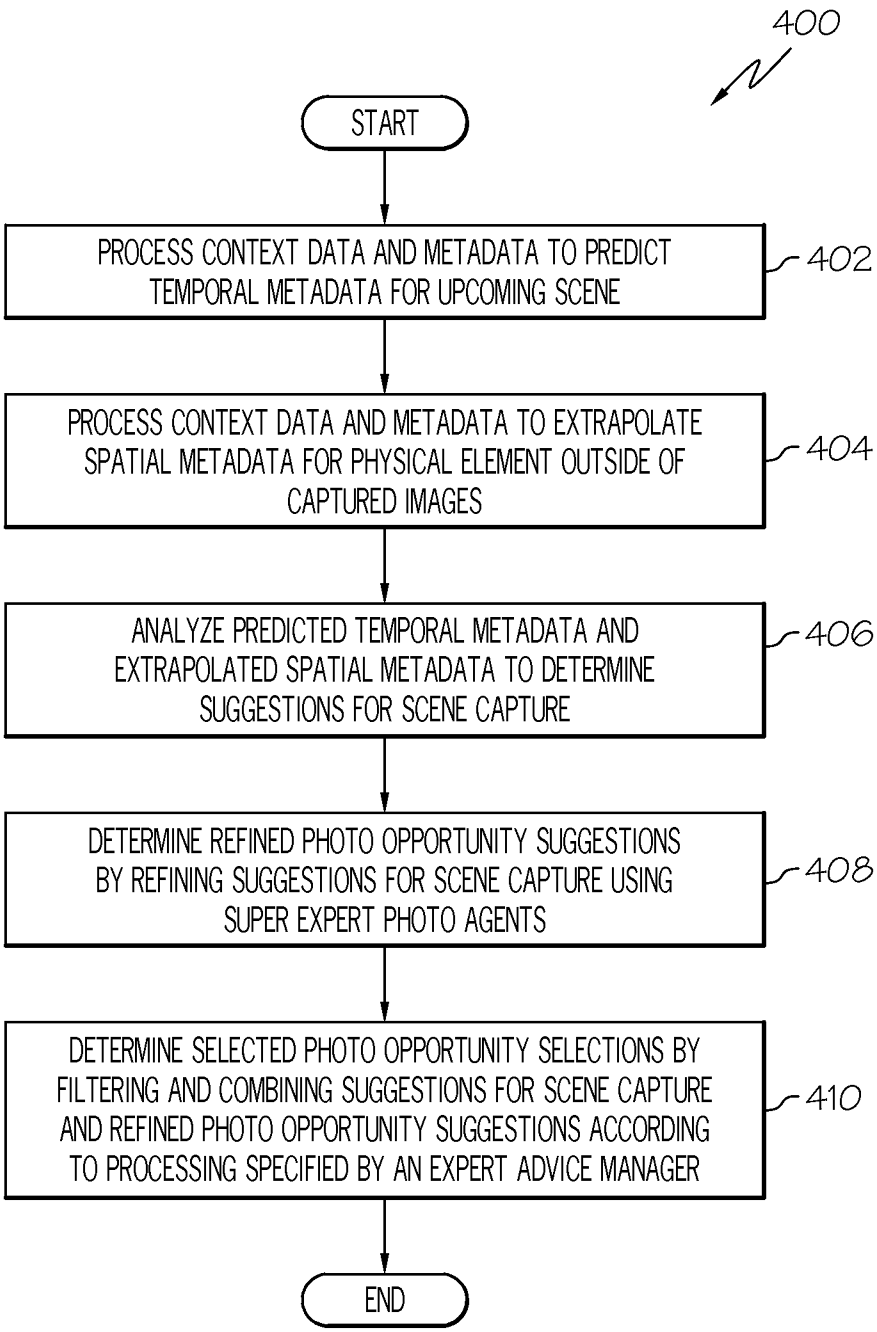
FIG. 4 illustrates an opportunity determination processing flow, in accordance with one embodiment of the present invention.

FIG. 2 presents a block diagram of a user-device data flow 200, in accordance with one embodiment of the present invention. FIG. 3 presents a diagram of an image processing flow 300, in accordance with one embodiment of the present invention. FIG. 4 illustrates an opportunity determination processing flow 400, in accordance with one embodiment of the present invention. The processing performed by a user-device 250, which in one example is a version of user 1's device 102, is described below with respect to both the user-device data flow 200, the image processing flow 300, and the opportunity determination processing flow 400.

The user-device data flow 200 shows a user-device 250 that includes several elements depicted therein. In one embodiment, user-device 250 includes a data transceiver 206 that communicates, for example, with other user-devices, such as user 2's device 104, through base station 110 or directly through a Bluetooth link 122. In one embodiment, data transceiver 206 receives data from a central database 202, which is part of the agent database 112. Data transceiver 206 is also able to receive data, such as images, photographic style models, environmental data, and the like, from associates 204 who have another user-device. Additionally, the data transceiver 206 of a user-device 250 is able to include circuitry to support communications with peer user-devices directly through, for example, Bluetooth connection 122. In one embodiment, data transceiver 206 is able to transmit observed environmental data to other user-devices. In one embodiment, data transceiver 206 is further able to transmit expert agents developed by a user of a particular user-device 250 to other user-devices or to a user defined agents database 240, such as would be included in agent database 112.

With reference to image processing flow 300 and user-device data flow 200, one embodiment of the present invention activates, at step 302, an image capture capability 210 of the user-device 250 and captures an image. User-device 250 of one embodiment, as is described in further detail below, is able to periodically or at various pre-determined times automatically activate the image capture capability 210 to capture a series of images.

In one embodiment, environmental sensors 208 within the user-device, such as sensors to detect sound, acceleration, temperature, location, and other environmental context data, are also polled and processed, at step 304, to gather data that is able to be integrated with data or metadata determined by processing of images, as is described below. The sensors within the user-device of one embodiment are able to be periodically polled and processed without capturing an image in order to enhance image capture opportunity detection. In one embodiment, additional environmental context data are collected, at step 306, from peer-devices such as user 2's device 104 or any other environmental sensor through the data transceiver 206. In one embodiment, additional environmental data is exchanged with other devices via a Bluetooth connection and/or networked services, if and when such connections and data are available.

The collected environmental context data and processed image data in one embodiment is stored in a decision input data store 214 where, in one embodiment, the data are organized into categories, e.g., location information (GPS, location relative to known objects, etc.) and capture device settings (focal length, aperture, zoom, flash, lighting, etc.).

Captured images are processed, at step 310, by one or more image processing algorithms 212 to produce metadata characterizing visual content of a captured image by processing the visual content of the captured image. Metadata characterizing the captured images is stored in one embodiment within the decision input data 214. Processing algorithms 212 that are able to be applied determine image capture parameters are algorithms that determine, for example, parameters used to select images as desirable, such as image illumination, color balance, focus, etc. These image capture parameters may have been selected according to a predefined image collection parameter profile or according to image capture parameters that were set by the user.

One embodiment of the present invention is able to also apply further image recognition algorithms 212 to the captured images in order to generate, at step 312, additional metadata characterizing, for example, the presence of certain shapes/patterns in the content, and/or identifying certain objects in the content, e.g., Millennium Park in Chicago. In one embodiment, the metadata is produced by processing the visual content of the captured image with more than one expert photo agent, where each expert photo agent produces a respective set of initial metadata.

One embodiment of the present invention assembles the metadata determined by the image analysis processing 212 that is stored in the decision input data 214 in order to support detecting opportunities to capture images that are of interest to the user. The decision input data 214 is processed in one embodiment by extrapolation algorithms 215, and by one or more expert photo agents according to an expert advice manager 222. The extrapolation algorithms 215 of one embodiment produce a set of extrapolated metadata characterizing extrapolated visual content based upon information contained within captured images. The metadata of one embodiment is produced by processing the visual content of captured images. In one embodiment, expert advice manager 222 manages and applies various expert photo agents, including, for example, expert photo agents 218 and super expert photo agents 220, as are described in more detail below. The processing of assembled metadata in one embodiment is performed according to the opportunity determination processing flow 400.

The processing of assembled metadata to determine image capture opportunities includes the periodic evaluation, at step 402, by a Temporal Extrapolation Engine (TEE) of the assembled metadata that was determined by analysis of one or more captured images and/or detected environmental data. The temporal extrapolation engine of one embodiment is part of the extrapolation algorithms 215 and determines further image capture opportunities for a user of a particular device. The temporal extrapolation engine of one embodiment outputs vectors of temporally extrapolated metadata characterizing image capture opportunities that it predicts will occur in the future.

Examples of processing and predictions performed by the temporal extrapolation engine of one embodiment of the present invention include: 1) identifying motion trajectories of objects currently in the scene, 2) using the Doppler Effect to “chase” moving objects that have transitioned from approaching to leaving the scene, 3) matching images to a database of time-tagged recurring events, e.g., Buckingham Fountain spouts water the highest during the first 5 minutes of each hour, and 4) applying Laws of Physics to estimate what will happen next to the objects in a scene, e.g., gravity, collisions, explosions, etc.

The processing of assembled metadata to determine image capture opportunities includes periodic evaluation, at step 404, by a Spatial Extrapolation Engine (SEE) of the assembled metadata that was determined by analysis of one or more captured images and/or detected environmental data. The spatial extrapolation engine of one embodiment is part of the extrapolation algorithms 215 and produces spatially extrapolated metadata characterizing estimates of other interesting image capture opportunities that may exist in the user’s current vicinity. The spatial extrapolation engine of one embodiment outputs vectors of spatially extrapolated metadata for scenes that the spatial extrapolation engine predicts to exist, based upon extrapolation of known metadata, if the image capture device were to be re-oriented in a specified direction.

One embodiment of the present invention implements a spatial extrapolation engine that is able to: 1) compare the current scene to a database of known images, and extrapolate the “missing portion.” 2) Integrate scene prediction with data from other environmental sensors, e.g., directional audio. For example, if a bird call is heard from a given direction, then there is a good probability that a bird can be photographed by aiming the image capture device in that direction. 3) Calculate the location of a light source in the current scene, and subsequently estimating the location of a region of maximal (best) illumination or backlighting (if this is the desired effect). 4) Use thermal imaging to identify temperature gradients in the image, and follow the gradient to points outside of the current scene to image other heat-producing entities. In one embodiment, the processing includes collecting environmental data from environmental sensors that are associated with the captured image, and producing a set of environmentally extrapolated metadata characterizing extrapolated visual content based upon the environmental data. Such embodiments determine an image capture opportunity selection based further upon the environmentally extrapolated metadata.

The extrapolated metadata produced by the spatial extrapolation engine and temporal extrapolation engine within the extrapolation algorithms 215 are analyzed, at step 406, to determine suggestions to provide to a user for image capture, such as photographs or movies to capture. One embodiment of the present invention further uses one or more Expert Photo Agents (EPAs) 218 to process, at step 408, the aggregated image, image metadata and context data that was gathered and/or determined for a current media capture scene. In one embodiment, the one or more Expert Photo Agents (EPAs) 318 are contained within a shared agent library 216. One embodiment of the present invention is able to store expert photo agents in the agent library 216 that consist of one or more of pre-configured expert photo agents that are configured into the user-device 250, expert photo agents that are defined by a user of the user-device 250, or expert photo agents that are downloaded from the agent database 112 through, for example, data transceiver 206.

The expert photo agents of one embodiment are able to further process metadata and other information determined for extrapolated scenes, e.g., scenes that are either spatially or temporally extrapolated based upon image and environmental data that was received/determined from captured data. Individual expert photo agents of one embodiment represent and/or determine one or more perspectives on the quality of the scene.

One embodiment of the present invention includes expert photo agents to determine, for example, image content balance and/or symmetry, identification of the presence of a dog or of the device owner’s dog, identification of straight edges within the image, identification of shadows within the image, and the like.

One embodiment of the present invention includes one or more expert photo agents that identify various objects or characteristics. Examples of some expert photo agents include, but are not limited to, agents that determine:

1) When to take a photo of a human subject, such as: focus on subject’s head, head and shoulders, head to waist, full body. Capture an image whenever someone is in a scene. Capture image of profile or facing-forward subject. Wait until subject smiles. Selecting one or more of these characteristics is able to be defined by the user or according to a sharable profile.

2) Desired lighting to capture an image, e.g., where is/are the light sources, relative to the image capture device?

3) Determination of object edges in a scene. Characterizations include determining a number of edges in the scene. Other characterization to determine when to capture desirable images include "Avoid the arrow," i.e., do any of the edges in the image form arrows? Do they form arrows when viewed with the corner of an image?

4) Object Centering: How much distance is there from the centroid of the largest/most important objects/people in the image? Who is in the center of the picture? (Most important person?)

5) Contrast: a) image level, and/or 2) Object level, e.g., "6 black ducklings vs. 1 yellow duckling"

6) Foreground/background: which one is in focus? Are both in focus? Number of objects in foreground/background. Image lighting.

7) Similarity of objects in image: repeated shapes, repeated gestures (as a set of shapes), what is the perceived axis of symmetry? Profile or user preference determines how this is computed: e.g., by color, shape or other logical content. Reflected shapes and repeated entities in different forms, e.g., a dog and a sign with a dog, etc.

8) Themes: e.g., some well-understood event, e.g., gestures indicating or detected sound saying "Hey that's mine. No. It's mine," emotion, repeated entities in different forms, e.g., two dogs, a dog and a sign with a dog, etc.

9) Humor: audible detection of defined comical phrases, image detection of inanimate objects/animals doing human things, e.g., "Enjoying the scent of a flower". (sensorial).

10) Thought provoking, e.g., "a good picture poses a good question."

11) Detected motion in a sequence of images: stop-action, still life, number of independent object motions in a scene, number of parallel/dependent object motions in a scene.

12) Uniqueness of images: check captured image with images stored in a local image database, check with a global image database. Checking with, for example, pre-scanned images that are readily characterized and analyzed through a neural network.

13) Logical Completeness: e.g., "One fish for every claw," each human has 2 legs, each animal has 4 legs, expected combinations.

14) Evocation of other senses: e.g., image about enjoying the scent of a flower, image with motion, implies touching something, image may imply loud music, advertising images for food products imply taste and smell—desire.

15) Imbalance: e.g. detected irony in an image such as "moose vs. fighter jet," "horses have only 1 head," unexpected combinations, e.g., a camel and snowman in the same scene.

16) Geometric Fit, e.g., "the cat fits in the shoe."

17) Orientation of items/people in the image: direction of gaze, orientation of primary axis.

18) Determination of embedded shapes/signs: "Dog's legs form the letter T." Determination is able to be by, for example, Hough Transforms to efficiently identify shapes in images.

In one embodiment, images are periodically captured and processed, along with other available data, to determine if conditions exist to satisfy a rule or model that indicates the captured image is an interesting image that should be retained. If/when the context data associated with a given scene are sufficient to trigger the rules/model within a given expert photo agents, the expert photo agents of one embodiment is able to provide an output indicating this status. For example, an output may have the following form: "photo opportunity" information:

{EPA ID, scene ID, interestingness score, <context summary> vector, <photo expert advice parameter set> vector}.

In order to allow a user to better capture the detected image of interest, one embodiment of the present invention is able to produce photo expert advice to assist the user to better capture the image. Photo expert advice is able to include: zoom, focus, flash, contrast, red eye reduction, filtering, and timing for a specific event.

One embodiment of the present invention includes a library of Super-Expert Photo Agents (SEPAs) 220 that process, at step 408, instances of "photo opportunity" information output by the expert photo agents selected to process metadata and image data. In one embodiment, the super expert photo agents implement one or more methods of combining the recommendations from multiple expert photo agents 218 regarding particular scene identification. For example, a super expert photo agent 220 is able to be defined to create hybrid or compound scores that are combinations of the outputs of the expert photo agents. One example of a super expert photo agent creates an arithmetic average of the outputs of multiple expert photo agents or a pre-defined weighted average of outputs of multiple expert photo agents. For example, a super expert photo agent may combine the output of three expert photo agents, identified as output quantity A1, A2, and A3, respectively as (A1+A2+A3)/3. Another super expert photo agent is able to combine these three outputs according to the equation ((0.5*A1)+(0.2*A2)+(0.3*A3)) to produce an output that is evaluated to determine selected photo capture opportunities. In one embodiment, determining the image capture opportunity selection by the super photo agents 220 is based upon such a combination of each of the respective set of initial metadata that is according to pre-defined criteria into a composite recommendation.

The data produced by the Expert Photo Agents 218 and the Super-Expert Photo Agents 220 are received and analyzed, at step 410, by an expert advice manager 222. The above analysis steps, in one embodiment, determine an image capture opportunity selection based upon processing of the metadata characterizing the captured image with at least one expert photo agent, where the image capture opportunity selection specifies content to capture in a subsequent image.

The expert advice manager 222 of one embodiment monitors, filters, and combines the instances of "photo opportunity" information according to the recommendations provided by the expert photo agents 218 and super expert photo agents 220. In one embodiment, the output of the super expert photo agent 220 is compared to a threshold to determine selected photo capture opportunities. The determining of the image capture opportunity selection of one embodiment includes filtering a plurality of composite recommendations, such as a time-sequence of composite recommendations, according to pre-defined criteria to produce the image capture opportunity selection.

Figure 5:
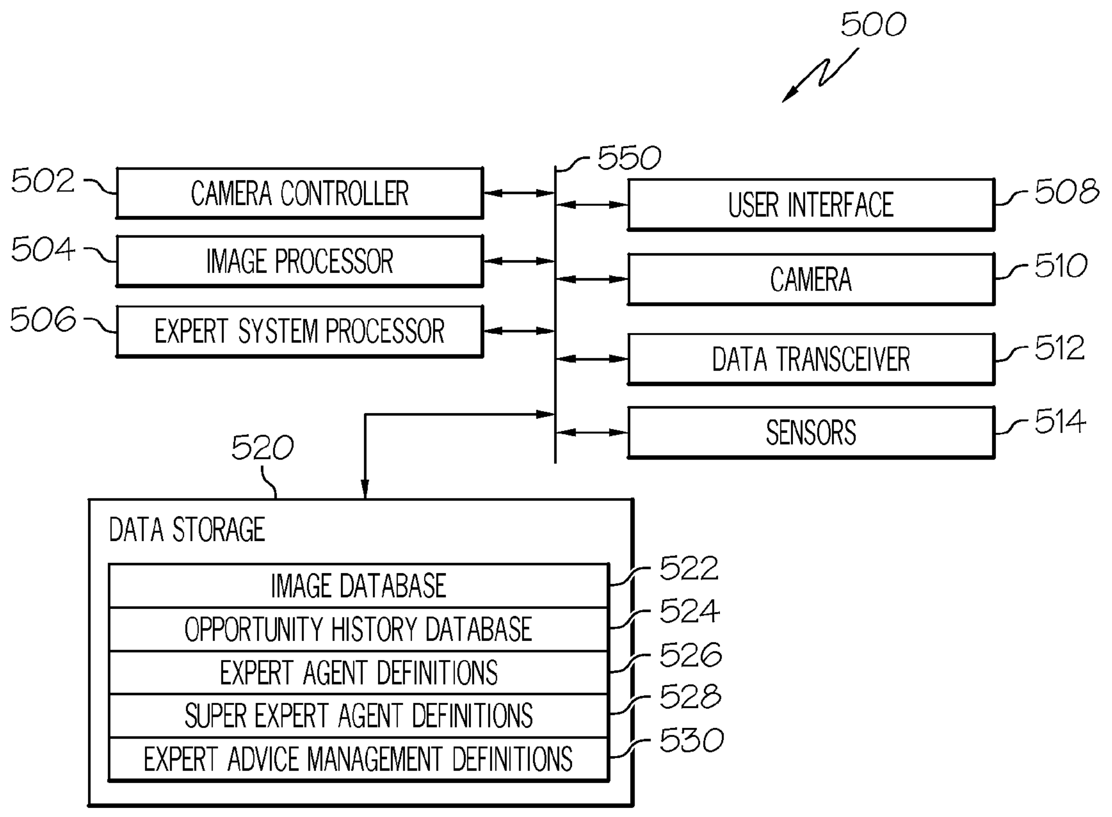
FIG. 5 illustrates a user-device component block diagram, in accordance with one embodiment of the present invention.

FIG. 5 illustrates a user-device component block diagram 500, in accordance with one embodiment of the present invention. The user-device block diagram 500 shows several components included within a user-device, such as user 1's device 102. Various processing components within the user-device block diagram 500 are able to communicate via a data communications bus 550.

A camera 510 of the user-device block diagram captures images to be processed by other components. Camera 510 of one embodiment is able to capture a sequence of images to operate as, in one example, a movie camera. Images captured by camera 510 are processed by an image processor 504. Image processor 504 is able to include any suitable image processing architecture, such as a programmable microprocessor, configurable digital signal processing hardware, or any suitable combination of those two or other processing architectures. Image processor 504 includes, for example, feature/shape detection processing, temporal extrapolation engines, spatial extrapolation engines, and any other image processing used to support expert photo agent processing.

Data produced by either one or both of camera 510 and image processor 504 is able to be stored in the data storage 520, as described below. Sensors 514 are able to determine environmental information, such as sounds, temperature, location, and the like.

A user interface 508 allows a user of the user-device to configure and/or control the operation of the user-device. User interface 508 is able to accept input from a user and is also able to display prompts and other information to the user. Camera controller 502 of one embodiment controls operation of the camera 510. Camera controller 502 is controlled either in response to inputs from the user via the user interface 508, or according to processing defined for the user-device according to, for example, expert systems or information determined by the image processor 504.

A data transceiver 512 of one embodiment is able to communicate with peer devices of associates of a user of a user-device. Data exchanged over the data transceiver 512 is discussed above and includes, for example, environmental information detected by sensors 514 and/or image capture related information extracted by the image processor 504 and/or expert system processor 506.

Expert system processor 506 processes, for example, metadata extracted or determined by the image processor 504 for one or more images captured by the camera 510 or environmental information detected by environmental sensors 514. Examples of expert systems processing, including expert photo agents, super expert photo agents, and expert agent managers, as is performed by one embodiment of the present invention is described above. Suggestions determined by the Expert system processor 506 of one embodiment of the present invention are able to be provided to a user via the user interface 508 or to camera controller 502 to capture images.

Data storage 520 includes a memory to store various items used by a user-device of one embodiment of the present invention. Data storage 520 includes an image database 522 to store captured images captured by camera 510. The image database 522 of one embodiment is able to store a sequence of capture images to support, for example, time extrapolation.

Data storage 520 further includes an opportunity history database 524 that is used to store image capture opportunities identified by the expert system processor 506. Data storage 520 further includes an expert agent definition database 526 that is used to store definitions of expert agents that are to be implemented by the expert system processor 506. Data storage 520 further includes a super expert agent definition database 528 that is used to store definitions of expert agents that are also to be implemented by the expert system processor 506. Expert agent definitions and super expert agent definitions that are stored in the expert agent definition database 526 and super expert agent definition database 528, respectively, are able to be one or more of pre-defined expert agents that are programmed into the user-device, user defined expert agents, and/or expert agents received from other user-devices or a remote agent database 112 through data transceiver 512.

Data storage 520 further includes expert advice management definitions 530 that define expert agent management algorithms that implement the expert advice manager 222 that manages and combines the output of various expert agents and super expert agents.

Figure 6:
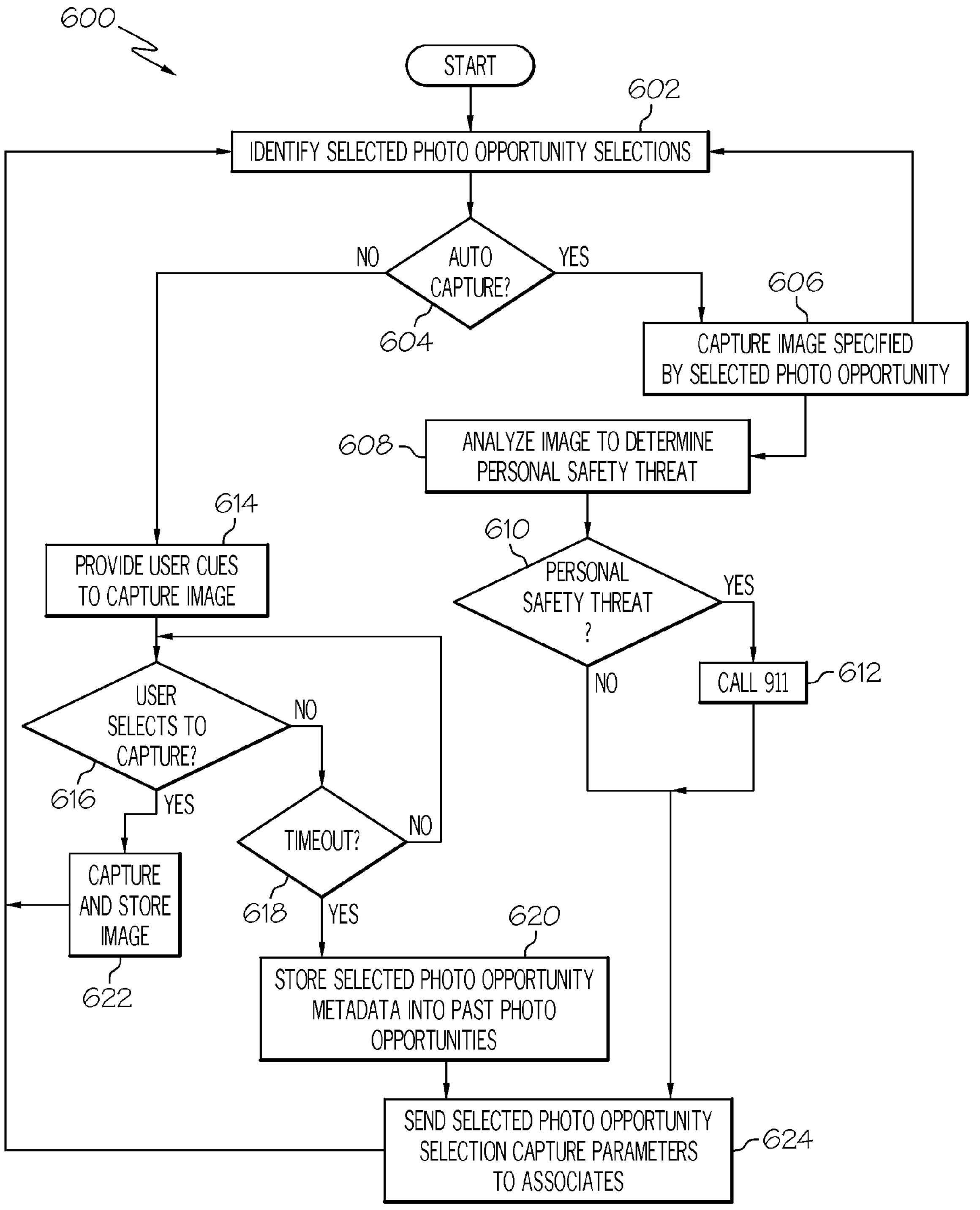
FIG. 6 illustrates an identified image capture processing flow, in accordance with one embodiment of the present invention.

FIG. 6 illustrates an identified image capture processing flow 600, in accordance with one embodiment of the present invention. The identified image capture processing flow 600 directs the capture of images that were identified by the expert advice manager 222 as possibly interesting according to the above described processing. The expert advice manager 222 of one embodiment identifies, at step 602, selected photo opportunity selections by comparing scores produced by the expert agent manager 222 to a threshold for minimum interestingness score, as specified, for example, by the user or a default value. If the score exceeds the threshold, the photo opportunity is identified as a selected photo opportunity. The "photo opportunity" instances selected by the expert advice manager 222, in one embodiment, are communicated to the User Interface (UI) Manager 508 and other application software controlling the media capture devices.

In one mode of operation, the "photo opportunity" instances determined by the expert advice manager 222 are configured to be "automatically captured," at step 604. If "auto capture" is configured, the processing advances to capture, at step 606, the image specified by the selected photo opportunity. These captured images are then stored in the automatic capture database 224 without further user intervention. The processing then automatically analyzes, at step 608, the context summary for a "photo opportunity" instance with a Personal Safety Monitoring Engine to determine if prespecified personal safety threat conditions are detected. The processing determines, at step 610 if there is a person safety threat and if so, the corresponding action is taken, e.g., a call is placed to 911, at step 612.

In the case that auto capture is determined, at step 604, to not be enabled, the processing continues by providing, at step 614, metadata describing one or more current "photo opportunity" instances are displayed on the user interface 508. The expert advice parameter set for one or more "photo opportunity" instances determined by the expert advice manager 222 are able to be further analyzed by a user cue generator 230 to generate user cues based on the time, location, and/or orientation of potentially interesting scenes.

The user cues derived based upon analysis of the "photo opportunity" instances determined by the expert advice manager 222 are able to be presented via one or more parts of the user interface 508, which is able to include a display, viewfinder, speaker, haptic interface, and the like. Further ways of providing user cues include, for example, a user interface 508 that includes a speaking voice, e.g., "Move left 30 degrees for a better view," guidance in the border of the viewfinder, the device shakes when you're not pointing it in a good direction, and it shakes less as you get closer to preferred direction, motorized mirror assembly to automatically track the best scene, e.g., a mechanical system that mimics how a frog's eyeballs bulge out and move a few degrees, even though the frog's head is motionless. In the case of providing user cues to change an image capture parameter, such as zoom, focus, and the like, the viewfinder is able to, for example, indicate zooming out by shrinking the displayed image and indicate zooming in by shading the border of the displayed image.

The processing determines, at step 616, if the user selects to capture one of these identified photo opportunities. If the user selects to capture one of the identified photo opportunities, the associated metadata is interpreted and used to capture, at step 622, media for the selected "photo opportunity." In one embodiment, the identified photo opportunities include an image capture opportunity selection that contains image capture parameters to be used to capture a subsequent image. The interpretation of metadata and media capture of one embodiment captures, with the at least one capture parameters defined by the image capture opportunity selection, the subsequent image.

In a case of a user not selecting to capture, at step 616, the processing determines, at step 618, if a timeout occurred. If a time out did not occur, the processing returns to determining, at step 616, if the user selects to capture. If a timeout does occur, the "photo opportunities" that are not selected by the user within the pre-specified time of the time out are removed from the current list and stored, at step 620, in an opportunity history data base 226. The opportunity history data base 226 of one embodiment may be reviewed by the user at a future time for, e.g., training purposes and/or for reconstructing potentially interesting scenes.

After a selected photo opportunity is stored, at step 620, or after an automatically captured photo is stored an analyzed, at step 610, the processing is able to send, at step 624, the selected photo opportunity selection capture parameters to user-devices used by associates of the user of this user-device. In one embodiment, selected photo opportunity selection capture parameters are sent or not sent to associates according to a pre-configured or user defined parameters. In one embodiment, the selected photo opportunity selection capture parameters are determined, for example, by the expert agent manager 222 alone or in combination with user input.

Figure 7:
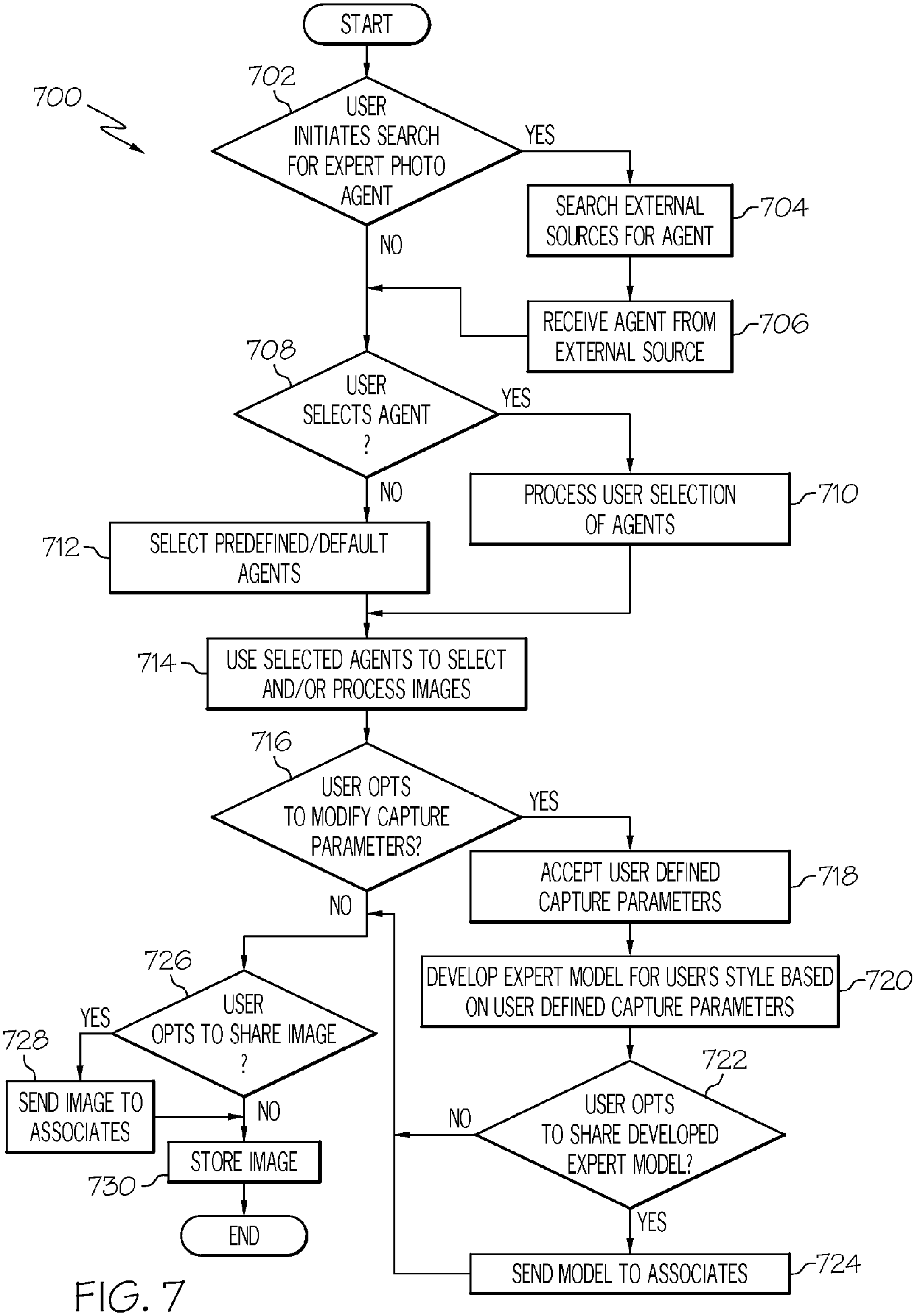
FIG. 7 illustrates an expert agent selection and definition processing flow, in accordance with one embodiment of the present invention.

FIG. 7 illustrates an expert agent selection and definition processing flow 700, in accordance with one embodiment of the present invention. One embodiment of the present invention allows a user to decide, at step 702, to initiate a search of external sources for one or more desired expert photo agents or super expert photo agents. In one embodiment, expert photo agents are available from external data bases, such as agent database 112, that operate to automatically implement photo capture parameters in a manner that emulates certain professional photographers or photojournalists. An operator of agent database 112 is able to charge users to download particular expert photo agents. A user is also able to query associate's user-devices to obtain an expert photo agent or super expert photo agent possessed and/or defined by that associate.

If the user decides to search for an expert photo agent, the processing searches, at step 704, external sources for expert photo agents. In one embodiment, the user forms a request to receive photo agents that match a user's specifications. That request is then transmitted to the sharable library, such as the agent database 112. The application software implementing intelligent media capture in one embodiment of the present invention allows sending and receiving expert photo agents and super expert photo agents in a standard representation or format. Expert photo agents or super expert photo agents are able to be communicated through any suitable medium, such as via Multimedia Message (MMS). Once the search is completed, the processing receives, at step 706, at least one expert photo agent or super expert photo agent that match the user's specification from the sharable library. In one embodiment, receiving at least one expert photo agent or super expert photo agent is obtaining, at a user-device, at least one expert photo agent adapted to process metadata extracted from a captured image. The user is given the option to apply a received expert photo agents or super expert photo agents to currently captured images and environmental data, or the user is able to select storing it (as inactive) for reference. A user is also able to simply discard received agents.

The processing then gives the user an opportunity to select, at step 708, one or more expert photo agents or super expert photo agents to use to capture images. If the user selects an agent, the selection is processed, at step 710. If the user did not decide to select an agent, the processing selects a predefined or default agent to use to capture images. The processing then proceeds to use the selected agent to select and/or process, at step 714, images that were captured with the camera 510.

Once an image is captured, the processing gives the user an option, at step 716, to modify image capture parameters. If the user opts to modify capture parameters, the processing accepts, at step 718, user defined capture parameters. In one embodiment, user defined capture parameters are accepted through user interface 508. Once user defined parameters are accepted, one embodiment of the present invention develops, at step 720, an expert model for the user's style based on the user defined capture parameters. The developed expert model is able to contain one or more expert photo agents and/or super expert photo agents that will yield consistent image capture results based upon the user's photographic style as determined by his or her manually defined capture parameters.

In one embodiment, Image and/or Video Mining techniques and Reinforcement Learning methods are used, during periods of low processor load, to create and/or improve the image capture model for a given user. In this way, it is possible to automatically discover style characteristics for a given user, based on his or her media captured. In one embodiment, the user's model is sent to a searchable, networked repository, such as agent database 112. In this manner, the sharable library comprises expert photo agents developed by users of peer systems.

A user of one embodiment is able to share expert photo agents or super expert photo agents with associates or even a more general audience. One embodiment of the present invention includes user-devices that give the user an option, at step 722, to send the user-developed model, which consists of photo expert agents and/or super expert photo agents developed to mirror the user's style, to associates. In one embodiment, the user is able to send a whole model or to compress the model to a certain size by manual or automatic techniques, such as by using the Text Mining approach of Adaptive Text Summarization, and/or by omitting certain features of the model.

The processing then continues to present an option to the user, at step 726, to share the captured image. If the user selects to share the image, the image is sent, at step 728, to associates. If the user opts to share the captured image or not, the image is stored, at step 730, and the processing ends.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for identifying image capture opportunities, the method comprising:

obtaining, at a user-device, at least one expert photo agent adapted to process metadata extracted from a captured image;

producing metadata characterizing visual content of the captured image and its photographic capture style characteristics, the photographic capture style characteristics being determined by user-defined capture parameters and the metadata being produced by processing the visual content of the captured image with the at least one expert photo agent;

developing an expert model containing the least one expert photo agent corresponding to the photographic capture style characteristics and sharing the developed expert model with a plurality of user devices; and determining, in response to producing the metadata, an image capture opportunity selection at the user-device based upon processing of the metadata with the at least one expert photo agent, the image capture opportunity selection specifying content to capture in a subsequent image, wherein the specified content includes the photographic capture style characteristics.

2. The method of claim 1, wherein the image capture opportunity selection contains image capture parameters to be used to capture the subsequent image, the method further comprising:

capturing, with the at least one capture parameters defined by the image capture opportunity selection, the subsequent image.

3. The method of claim 1, wherein producing the metadata comprises processing the visual content of the captured image with a plurality of expert photo agents, wherein each expert photo agent within the plurality of expert photo agents produces a respective set of initial metadata, wherein the determining comprises determining the image capture opportunity selection based upon a combination of each of the respective set of initial metadata according to a pre-defined criteria.

4. The method of claim 1, wherein producing the metadata comprises:

processing the visual content of the captured image with a plurality of expert photo agents, wherein each expert photo agent within the plurality of expert photo agents produces a respective set of initial metadata;

combining each of the respective set of metadata into a plurality of composite recommendations according to a respective pre-defined criteria for each composite recommendation; and generating a plurality of image capture recommendations the image capture opportunity selection based upon a combination of each of the respective set of metadata according to a pre-defined criteria; and determining comprises filtering the plurality of composite recommendations according to pre-defined criteria to produce the image capture opportunity selection.

5. The method of claim 1, further comprising:

producing a set of extrapolated metadata characterizing extrapolated visual content based upon information contained within a captured image, the metadata being produced by processing the visual content of the captured image, wherein the determining the image capture opportunity selection is further based upon the extrapolated metadata.

6. The method of claim 5, wherein the set of extrapolated metadata comprises spatially extrapolated metadata determined by processing of the captured image and temporally extrapolated metadata determined by processing of the captured image.

7. The method of claim 1, further comprising:

collecting environmental data associated with the captured image; and producing a set of environmentally extrapolated metadata characterizing extrapolated visual content based upon the environmental data, wherein the determining the image capture opportunity selection is further based upon the environmentally extrapolated metadata.

8. The method of claim 7, wherein the set of environmentally extrapolated metadata comprises spatially extrapolated metadata determined by processing of the captured image and temporally extrapolated metadata determined by processing of the captured image.

9. The method of claim 1, wherein the obtaining comprises:

forming a request to receive photo agents that match a user's specifications;

transmitting the request to a sharable library; and receiving, from the sharable library, the at least one expert photo agent that match the user's specification.

10. The method of claim 1, wherein the obtaining obtains the at least one expert photo agent from a sharable library that comprises a central repository of expert photo agents.

11. The method of claim 1, wherein the obtaining obtains the at least one expert photo agent from a sharable library that sharable library comprises expert photo agents developed by users of peer systems.

12. The method of claim 1, wherein the obtaining obtains the at least one expert photo agent from a sharable library, the method further comprising:

maintaining the sharable library, wherein the sharable library is communicatively accessible to the plurality of user-devices; and charging, in response to the obtaining, a user for use of the at least one expert photo agent.

13. An image capture opportunity detector, comprising:

a memory;

a processor, communicatively coupled to the memory, the processor adapted to:

obtain, at a user-device, at least one expert photo agent adapted to process metadata extracted from a captured image;

produce metadata characterizing visual content of the captured image and its photographic capture style characteristics, the photographic capture style characteristics being determined by user-defined capture parameters and the metadata being produced by processing the visual content of the captured image with the at least one expert photo agent;

develop an expert model containing the least one expert photo agent corresponding to the photographic capture style characteristics and share the developed expert model with a plurality of user devices; and determine, in response to producing the metadata, an image capture opportunity selection at the user-device based upon processing of the metadata with the at least one expert photo agent, the image capture opportunity selection specifying content to capture in a subsequent image wherein the specified content includes the photographic capture style characteristics.

14. The image capture opportunity detector of claim 13, wherein the processor is further adapted to:

produce the metadata by processing comprising processing the visual content of the captured image with a plurality of expert photo agents, wherein each expert photo agent within the plurality of expert photo agents produces a respective set of initial metadata; and determine the image capture opportunity selection by processing comprising determining the image capture opportunity selection based upon a combination of each of the respective set of initial metadata according to a pre-defined criteria.

15. The image capture opportunity detector of claim 13, wherein the processor is further adapted to:

produce the metadata by processing comprising:

processing the visual content of the captured image with a plurality of expert photo agents, wherein each expert photo agent within the plurality of expert photo agents produces a respective set of initial metadata;

combining each of the respective set of metadata into a plurality of composite recommendations according to a respective pre-defined criteria for each composite recommendation; and generating a plurality of image capture recommendations the image capture opportunity selection based upon a combination of each of the respective set of metadata according to a pre-defined criteria; and determine the image capture opportunity selection by processing comprising filtering the plurality of composite recommendations according to pre-defined criteria to produce the image capture opportunity selection.

16. The image capture opportunity detector of claim 13, wherein the processor is further adapted to:

produce a set of extrapolated metadata characterizing extrapolated visual content based upon information contained within a captured image, the metadata being produced by processing the visual content of the captured image; and determine the image capture opportunity selection based further upon the extrapolated metadata.

17. The image capture opportunity detector of claim 13, further comprising:

at least one environmental sensor adapted to collect environmental data associated with the captured image, and wherein the processor is further adapted to:

producing a set of environmentally extrapolated metadata characterizing extrapolated visual content based upon the environmental data; and determine the image capture opportunity selection is based further upon the environmentally extrapolated metadata.

18. An image capture opportunity image capturing device, comprising:

a camera;

at least one environmental sensor; a memory;

a processor, communicatively coupled to the memory, the camera, and the environmental sensor, the processor adapted to:

obtain, at a user-device, at least one expert photo agent adapted to process metadata extracted from a captured image;

produce metadata characterizing visual content of the captured image and its photographic capture style characteristics, the photographic capture style characteristics being determined by user-defined capture parameters and the metadata being produced by processing the visual content of the captured image with the at least one expert photo agent;

develop an expert model containing the least one expert photo agent corresponding to the photographic capture style characteristics and sharing the developed expert model with a plurality of user devices;

determine, in response to producing the metadata, an image capture opportunity selection at the user device based upon processing of the metadata with the at least one expert photo agent, the image capture opportunity selection specifying content to capture in a subsequent image wherein the specified content includes the photographic capture style characteristics; and configure the camera to capture, with the at least one capture parameters defined by the image capture opportunity selection, the subsequent image.

19. The image capture opportunity image capturing device of claim 18, further comprising:

a data transceiver, communicatively coupled to the memory, the data transceiver adapted to receive the at least one expert photo agent.

20. The image capture opportunity image capturing device of claim 18, wherein the processor is adapted to produce metadata by a process comprising:

processing the visual content of the captured image and photographic capture style characteristics with a plurality of expert photo agents, wherein each expert photo agent within the plurality of expert photo agents produces a respective set of initial metadata;

combining each of the respective set of metadata into a plurality of composite recommendations according to a respective pre-defined criteria for each composite recommendation; and generating a plurality of image capture recommendations the image capture opportunity selection based upon a combination of each of the respective set of metadata according to a pre-defined criteria, and wherein the processor is adapted to determine an image capture opportunity selection by a process comprising filtering the plurality of composite recommendations according to pre-defined criteria to produce the image capture opportunity selection, wherein the image capture opportunity selection includes the photographic capture style characteristics.

* * * * *